United States Patent Office 2,766,133
Patented Oct. 9, 1956

2,766,133

FINISHING OF RUTILE TITANIUM DIOXIDE

Guy C. Marcot and Gerard M. Sheehan, Lynchburg, Va., assignors to American Cyanamid Company, New York, N. Y., a corporation of Maine No Drawing. Application June 25, 1952,
Serial No. 295,562

9 Claims. (Cl. 106—300)

The present invention relates to the finishing of chalk-resistant rutile titanium dioxide produced in the presence of a zinc compound as conditioning agent. More particularly, the present invention relates to the novel step in the finishing of such a titanium dioxide into pigmentary form wherein a large proportion of the zinc is leached from the titanium dioxide. Upon completion of the finishing, a pigment is obtained which possesses numerous improved properties at no sacrifice to its chalk resistance.

At the present time, the principal commercial method for the manufacture of titanium dioxide pigments commences with the digestion of a titaniferous material such as ilmenite with strong sulfuric acid, to form a digestion cake predominantly composed of titanium sulfate and iron sulfate. The cake is then dissolved in water, and the solution heated. The titanium sulfate is then subjected to a selective controlled hydrolysis so as to form the well-known titania hydrolysate which precipitates, while the iron and associated impurities remain in solution. The mother liquor is filtered off and the hydrolysate recovered. After a series of washings to remove adsorbed and occluded impurities, this hydrolysate, hereinafter designated "washed titania hydrolysate," is calcined to yield titanium dioxide.

During calcination, the hydrolysate is first converted to anatase titanium dioxide. When, however, the calcination is performed at a sufficiently high temperature for a sufficient length of time, yields of rutile are obtained. It is known that when the washed titania hydrolysate is calcined in the presence of between about ½% and 5% of zinc oxide or a zinc compound which is decomposed or which is convertible to zinc oxide at calcination temperature, based on the weight of the $TiO_2$ equivalent of the hydrolysate, numerous benefits are conferred. Most importantly, formation of rutile takes place at a lower temperature and in a shorter time than would otherwise be the case. Then, the particles of the titanium dioxide, when finished into a pigment, are more uniform in size, and more acicular in form. Furthermore, when finished into a pigment and incorporated into paint or enamel vehicles, this titanium dioxide displays outstanding resistance to chalking when exposed to the weather. When used in effective amounts to produce these results, the zinc is termed a "conditioning agent" and the calciner discharge is termed "conditioned rutile titanium dioxide." Zinc sulfate, zinc oxide, zinc nitrate, zinc carbonate, zinc hydroxide, and the zinc salts of organic acids have been satisfactorily used for this purpose. In addition, the hydrolysate may, and frequently will contain a mineralizing agent, for example, an alkali metal carbonate, and a stabilizer to prevent undesirable color shifts during the calcination.

In addition, titanium dioxide is produced commercially by the combustion of gaseous titanium tetrachloride with oxygen. By correlating the temperature of the combustion with the speed at which the titanium dioxide thus formed passes through the combustion zone, a material containing a high proportion of rutile can be formed. It is possible in this process to mix gaseous zinc chloride with the titanium tetrachloride to form a mixture containing 1.2% to 12% of zinc chloride based on the weight of the titanium tetrachloride. Upon combustion with oxygen this gaseous mixture yields a pigment containing about ½% to 5% zinc calculated as ZnO.

The use of zinc in the manner described is not without its disadvantages. One such disadvantage is that it causes a marked increase in the activity of the pigment, causing livering. A further disadvantage is that the pigment is too prone to flocculate when incorporated in organic vehicles, thus giving rise to paints and enamels having a high consistency or apparent viscosity. When the consistencies of such vehicles are reduced by thinners to adapt them to spray application, underloaded films tend to be deposited. Up to the present, it has not been found possible to modify or alter conditioned titanium dioxide pigment so as to make it suitable for general use as the forms of titanium dioxide pigment which contain no zinc.

Only a small amount of zinc need be added as conditioning agent to effect the beneficial results described above. The use of more than 5% of zinc, calculated as ZnO, based on the $TiO_2$ equivalent of the hydrolysate, fails to increase more than negligibly, if at all, the ease with which rutile is formed and the chalk-resistance of the pigment. On the other hand, when less than ½% zinc is used, calculated in the same manner, the proportion of rutile formed and the chalk resistance of the pigment fall off seriously. As a result, it is present commercial practice to calcine titania hydrolysate in the presence of between 1% and 2% zinc calculated as ZnO and based on the $TiO_2$ equivalent of the hydrolysate. This is sufficient to cause substantially 100% conversion, at about 800° C. to 1000° C., of the titania hydrolysate to rutile suitable for finishing to a pigment of substantially maximum chalk resistance, while minimizing consumption of the zinc compound. The same ratios are employed when the pigment is produced by combustion of titanium tetrachloride and zinc chloride. In both these processes, virtually all of the zinc employed appears in the finished pigment as a substantially water-insoluble salt.

The conditioning effects produced by zinc in the range set forth above should not be confused with the effects produced by the presence of smaller or larger proportions of zinc during formation of the titanium dioxide. When titania hydrolysate is calcined in the presence of less than about ½% of zinc calculated as ZnO, the effect of the zinc is primarily to stabilize the color of the titanium dioxide at the high temperatures employed. Such small amounts do not increase the chalk resistance of the product to any significant degree. When more than about 5% of zinc is present, a product of different composition results having reduced pigmentary value.

The above processes for the formation of conditioned rutile titanium dioxide are well known in the art and form no part of the present invention.

The discovery has now been made that during the normal finishing of a zinc containing conditioned rutile titanium dioxide into pigmentary form, a large part of the zinc can be selectively removed by a simple leaching step, essentially conventional in character, without harm to the chalk resistance and with enhancement of the other pigmentary qualities of the titanium dioxide. It has further been discovered that when this leaching is continued until more than 25% of the zinc present has been removed, and preferably until the zinc content of the titanium dioxide is between about ⅓% and 0.005% calculated as ZnO based on the weight of titanium dioxide, a pigment is obtained on completion of all the normal finishing steps which possesses numerous and important beneficial properties. It has still further been found that when the leached pigment is dried to remove substantially all the water therefrom, certain of these beneficial properties are augmented.

In the first place, in comparison with their non-leached counterparts, the selectively leached pigments of the present invention are more rapidly and readily incorporated in paints and enamel vehicles, permitting this operation to be performed in much shorter time and with much reduced power consumption. The leached pigments which have been dried to remove substantially all the free water therefrom are outstanding in this respect.

Then, when similarly compared, the leached pigments of the present invention yield paints and enamels having lower consistencies or apparent viscosities. As a result, the loading or degree of pigmentation of an enamel or paint may be markedly increased without causing any increase in the consistency of the product prepared by the use of a non-leached counterpart pigment. The deposition of denser and more opaque films thus becomes possible.

Moreover, it has been found that pigments prepared according to the process of the present invention when incorporated into alkyd resins and other surface coating materials and baked, yield films which have better color and gloss than corresponding films prepared by the use of pigments which have not been leached. Surface coatings containing pigments prepared according to the present invention show better flow and levelling characteristics.

It has still further been found that the pigments of the present invention are less physically or chemically active and have less tendency to flocculate in organic media than pigments which have not been leached. As a result, paints containing these new pigments display longer shelf life and have little or no tendency to liver.

Still further, the leached pigments of the present invention display a reduced adsorptivity for oil, permitting the preparation of paints and other surface coatings with less consumption of film-forming ingredients.

Conditioned rutile titanium dioxide is normally produced in the form of a highly flocculated material containing both particles of pigmentary size as well as oversize particles, usually particles larger than about 4 microns in size. At some stage in the finishing of this material into pigmentary form, it is usually necessary to remove these oversize particles. It is universal practice to remove these particles by hydroclassifying the conditioned titanium dioxide into two fractions, one containing particles of pigmentary size and the other containing the oversize particles. This step requires that the titanium dioxide be deflocculated. It is a characteristic of conditioned rutile titanium dioxide that it is most resistant to deflocculation and cannot be satisfactorily deflocculated even by the use of sodium hydroxide. When leached according to the process of the present invention, however, the titanium dioxide is readily deflocculated by the addition of as little as 0.03% of sodium hydroxide to a slurry thereof, based on the weight of the titanium dioxide, causing formation of a stable deflocculated dispersion. Unleached zinc containing conditioned titanium dioxide, when slurried in the same manner with the same amount of sodium hydroxide, yields an unstable dispersion which settles rapidly with excessive floc formation.

It is a most important feature of the present invention that the above-recited beneficial results are attained without sacrifice of the chalk-resistance of the pigment, and without requiring any change in steps previously employed for finishing zinc-containing conditioned rutile titanium dioxide into pigmentary form.

The reason why the step of leaching zinc from conditioned rutile titanium dioxide effects so many and so important improvements is not known, and applicants do not wish to be limited to any particular theory.

More in detail, according to a preferred procedure of the present invention, conditioned rutile titanium dioxide is formed into a slurry with a predetermined amount of an aqueous solution of the leaching agent and is agitated therewith until a large proportion of the zinc has been selectively solubilized, that is, until the zinc content of the pigment has been reduced to between about ⅓% and 0.1% of the weight of titanium dioxide present without solubilization of the titanium dioxide. The titanium dioxide is then subjected to normal finishing steps to develop the pigmentary qualities of the material. Ordinarily, the leached titanium dioxide will be washed, hydroclassified to remove oversize or non-pigmentary particles, dried, and jet milled. In addition, the milled titanium dioxide may be coated with alumina gel, silica gel, or hydrous titanium dioxide, or with a combination of these materials, still further improving the pigmentary qualities of the material. These supplementary finishing steps are well known and are therefore recited broadly, as they form no part of the present invention.

Any leaching method may be employed which has been used in the past for selectively solubilizing zinc present as zinc oxide or the equivalent from admixture with a comparatively inert material. In the past, for example, zinc has been selectively leached from comparatively inert materials by the use of aqueous sodium cyanide; sodium cyanide plus ammonium hydroxide; hydrocyanic acid; hydrocyanic acid plus ammonium hydroxide; pyridine bases, mono, di and tri ethanolamines; sodium hydroxide; potassium hydroxide; ammonium hydroxide; ammonium chloride; acetic acid, and chloroacetic acid. In general, therefore, any reagent corresponding to the above may be used, these reagents having the capacity of forming water-soluble salts or complexes from zinc present as zinc oxide in admixture with titanium dioxide.

The above-mentioned reagents suffer from the disadvantage of being noxious, slow in their action, or uneconomically costly. We prefer therefore to use a dilute solution of one of the strong mineral acids such as sulfuric acid, phoshoric acid, nitric acid or hydrochloric acid. Of these sulfuric acid is the most advantageous since dilute or spent sulfuric acid is normally a troublesome industrial waste, yet rapidly and uniformly removes the zinc without harm to the titanium dioxide.

The highest concentration of the solubilizing reagent which may safely be used varies with the particular reagent selected and the temperature. The maximum concentration therefore cannot be stated numerically, but should be insufficient to cause any substantial reaction of the titanium dioxide to take place with the reagent. In the case of sulfuric and phosphoric acids this highest concentration, that is, the concentration at which the titanium dioxide begins to be attacked, has been found to be about 40% when the acids are used at room temperature and about 25% when the leaching is performed at 70° C. Effective leaching does not require acids of this strength, and as a practical matter the zinc is selectively removed in a rapid yet uniform manner, that is, without substantial solubilization of the titanium dioxide, when the strong mineral acid used has a concentration of about 10%. Very dilute mineral acids may also be employed, but when the strength of the acid falls to about 1%, the leaching becomes uneconomically slow. In the case of sodium hydroxide, a concentration of about 10% has yielded satisfactory results, and the use of more concentrated solutions than 25% is not advantageous.

No definite time can be set as the duration necessary for the leaching, as this varies principally with the amount of zinc originally present in the titanium dioxide, the particular leaching reagent used and the amount and strength thereof, and the temperature. The step, however, is a slow one. About one hour is required at room temperature when 10% sulfuric acid is used to leach a titanium dioxide containing 1.0% zinc calculated as ZnO to 0.25% zinc content, and several hours when 10% sodium hydroxide is employed at 70° C. to effect the same results.

The temperature at which the titanium dioxide is leached is not critical and good results with dilute mineral acids have been obtained at room temperature. Higher temperatures accelerate the speed of the reaction and a temperature of about 70° C. is preferred.

The proportion of leaching reagent which must be used is not critical, but leaching of the zinc takes place much more rapidly when a large excess is used over that stoichiometrically necessary. Preferably the excess will be at least about 100%.

The amount of zinc which should be removed by the leaching step, however, is of importance. The beneficial effects referred to above do not become significant until the zinc content of the pigment, calculated as ZnO, has been reduced by at least 25%. Best results are not attained until the zinc content, calculated as ZnO, has been reduced to ⅓% of the weight of the titanium dioxide present. On the other hand, we have found that it is not advantageous to continue the leaching until the amount of zinc present, calculated as ZnO, is below about 0.05% of the weight of the titanium dioxide. We have found that this residual percentage of zinc is very tenaciously held, and does not adversely affect the properties of the pigment obtained. Accordingly, therefore, the pigment after leaching will normally contain between about ⅓% and about 0.1% zinc calculated as ZnO, and preferably will contain zinc in the intermediate proportion of about ¼%, based on the weight of titanium dioxide present.

The leaching step may be performed, in the absence of particular considerations, at any desired point in the normal finishing of the conditioned rutile titanium dioxide to the pigment stage. Thus, where the conditioned titanium dioxide is made by the calcination process described, the calciner discharge may be leached directly, with or without pulverization. If desired, the leaching step may be deferred until the hydroclassification step has been completed and may be further deferred until the titanium dioxide has been treated with such materials as sodium silicate or aluminum hydroxide. In the latter event, however, the particular leaching reagent employed may cause partial or complete removal of the treating agent or agents used. Preferably, however, the titanium dioxide will be subjected to leaching prior to its hydroclassification, as when the leaching is performed at this point, the leached material may be deflocculated and hydroclassified by the use of sodium hydroxide.

The invention has been fully disclosed above. Preferred embodiments of the invention are set forth in the examples which follow and which illustrate, but do not limit, the invention as disclosed. Parts are by weight unless otherwise noted.

*Example 1*

Conditioned rutile titanium dioxide was prepared by blending a commercial, washed titania hydrolysate with 0.6% of potassium carbonate and 1% of zinc sulfate calculated as ZnO, on the $TiO_2$ equivalent of the hydrolysate, and 2.5% of the rutile seeding agent of Example 2 of U. S. Patent No. 2,494,492, and calcining the blend at 870° C. for 3 hours in a laboratory calciner. The calciner discharge was substantially 100% rutile titanium dioxide, as determined by X-ray diffraction analysis and analyzed 0.98% zinc as ZnO based on the weight of the titanium dioxide. The calciner discharge was pulverized in a mortar and divided into aliquots of 100 parts each. One of these aliquots was acid-leached by stirring with 250 parts of 10% sulfuric acid at 55° C. for 1 hour. The slurry was then filtered and the filter cake washed with 200-part increments of water until the pH of the last filtrate was 6.0. The washed filter cake was slurried with 400 parts of water, deflocculated by the addition of 0.3% $SiO_2$ as sodium silicate based on the weight of the $TiO_2$, stirred, and hydroclassified to eliminate particles larger than about 4 microns in size. The classified fines were flocculated by the addition of an aqueous solution containing 1% of $BaCl_2.2H_2O$, based on the weight of the fines. The fines were then filtered, dried at 115° C. for 1 hour and disintegrated in a laboratory Mikropulverizer. The pigment so prepared (pigment A) analyzed 0.25% ZnO.

A second aliquot of the calcined titanium dioxide was processed in the same manner (pigment B) omitting, however, the acid-leaching step.

The step of deflocculating conditioned titanium dioxide in the presence of sodium silicate is disclosed and claimed in copending application Serial No. 219,117, filed on April 3, 1951, by Walter R. Whately, now U. S. Patent No. 2,626,707.

The two pigments thus obtained were evaluated by mulling 5 grams of each pigment 50 times with 3.5 cc. of Glyptal resin No. 2462 (an alkyd resin manufactured by General Electric Co.) on a Hoover muller carrying a 150-pound weight. A paste was collected, mixed with 0.34 cc. of xylene and mulled 50 more times. The paste was thinned with the vehicle formed by mixing 6.9 grams of the Glyptal resin with 1.4 grams of xylene. From the resulting enamel, pulldowns were made at 0.55 mil thickness and baked for 1 hour at 350° F. The pulldowns were then evaluated visually for gloss, in comparison with a standard or reference pulldown made in the same manner but using the commercial titanium dioxide pigment known to produce the highest gloss and the whitest color. Results are reported on the scale of 10, in which 10 is the gloss value of the reference standard, 0 is the pure white matte surface, and 5 is the gloss intermediate between the two. A gloss value on this scale of 7 or less represents a pigment which will not yield commercially acceptable high gloss enamel finishes, while a higher value designates a commercial product satisfactory in this respect.

The pulldowns were also rated for color by assigning to the standard or reference pulldown the arbitrary rating of 12, and subtracting therefrom the number of points by which the color of the test pulldowns differed from the standard; each one quarter point subtracted represents the slightest difference in color which can be detected upon careful comparison of the test pulldown with the reference standard by an experienced color analyst. Results of the evaluations described above are as follows.

| Pigment | Zinc Content As ZnO, Percent | Gloss | Color |
|---|---|---|---|
| A | 0.25 | 8 | 11¼ |
| B | 0.98 | 5 | 8½ |

The oil adsorption of the pigments was determined by the standard method of placing 5.0 grams of the pigment on a glass plate and mulling acid refined linseed oil (KVO acid number 3) into the pigment with a spatula. In this test the linseed oil is added very slowly, and the end point is reached when enough oil has been incorporated to produce a very stiff paste, which is retained by the spatula without falling or adhering to the plate. Results are expressed as grams of oil so absorbed per 100 g. of pigment.

| Pigment | Zinc Content As ZnO, Percent | Oil Absorption |
|---|---|---|
| A | 0.25 | 22 |
| B | 0.98 | 25 |

*Example 2*

The procedure for the preparation of pigment A of Example 1 was repeated, except that the acid-leaching step was performed at a temperature of 70° C. and the leaching was continued until the titanium dioxide analyzed 0.10% zinc calculated as ZnO. A part of the pigment thus obtained (pigment C) was made into an alkyd resin enamel and evaluated for gloss and color in the manner described. Results are as follows.

| Pigment | Zinc Content As ZnO, Percent | Gloss | Color |
| --- | --- | --- | --- |
| A | 0.25 | 8 | 11½ |
| C | 0.1 | 8½ | 11¾ |

*Example 3*

Paints were prepared and evaluated from the unleached pigment of Example 1 (pigment B) which contained 0.98% zinc as ZnO and the pigment of Example 2 which had been leached to 0.10% Zn as ZnO content (pigment C), as follows:

50 parts of pigment B and 50 parts of pigment C were separately slurried with 150 parts of water containing 0.3% $SiO_2$ as sodium silicate, based on the weight of the titanium dioxide in the pigments. An aqueous solution containing 12 parts of $Al_2(SO_4)_3 \cdot 18H_2O$ was then added to each of the two slurries. The pH of the two slurries were adjusted to 7.0 by the addition of aqueous sodium carbonate, which precipitated the alum on the particles as aluminum hydroxide. The treated pigments, respectively designated pigments D and E, were then washed with water, dried at 115° C. for 1 hour, chaser-milled to reduce their oil absorption, and then processed as follows to determine their mixing and consistency characteristics, chalk resistance and oil absorption.

The comparative mixing and consistency characteristics of the two pigments were determined as follows. 250 parts of pigment were added to 100 parts of heat-bodied linseed oil (Archer Daniels Midland Co. No. 371, iodine value 155–165, acid-number 4–6, saponification 189–195), in a standard laboratory change can mixer. The motor was started immediately upon the addition of the pigment to the oil and the time required, in each instance, for the pigment and oil to form a firm ball was noted with a stopwatch. The mixing was continued, and the time required for the ball to start to "break" or form a mobile system was similarly noted. The mixing was further continued for 5 additional minutes. Linseed oil was then added to the two pastes to reduce their pigmentation to 61%, mixing was continued for 3 minutes, and the resulting pastes were given two passes at a tight setting through a laboratory 3-roll mill. The products were tested at a temperature of 77° F. in a Stormer viscosimeter provided with a 350 gram weight. The results of these tests are as follows:

| Pigment | Zn Content As ZnO, Percent | Ball Time [1] | Break Time [1] | Viscosity [2] |
| --- | --- | --- | --- | --- |
| D | 0.98 | 175 | 250 | 260 |
| E | 0.10 | 130 | 180 | 210 |

[1] Seconds.
[2] Seconds per 100 revolutions.

*Example 4*

The chalk resistance of pigments D and E was determined by forming pastes of the pigment with linseed oil in the manner described in Example 3 to which, however, 0.3% Pb as lead naphthenate and 0.03% Co as a cobalt naphthenate had been added. After milling, the pastes were let down with sufficient thinner to provide films of 20% $TiO_2$ content by volume. One portion of each of the pastes was then tinted grey by the addition of about 2.0% lampblack. The six samples obtained were then applied to primed steel panels, dried at room temperature for 48 hours and tested in a standard laboratory National Carbon Co. twin arc accelerating weathering unit to determine the time at which initial chalking and final film breakdown occurred. The panels were observed for chalking once during each day. Results are as follows:

| Pigment | Zn Content As ZnO, Percent | White | | Grey | |
| --- | --- | --- | --- | --- | --- |
| | | Initial Chalking, Hours | Film Breakdown, Hours | Initial Chalking, Hours | Film Breakdown, Hours |
| D | 0.98 | 350 | 850 | 260 | 630 |
| E | 0.10 | 340 | 840 | 256 | 626 |

These results demonstrate that the leaching step to which pigments D and E were subjected does not significantly alter the chalk resistance of films pigmented therewith.

*Example 5*

A sample of pigment C containing 0.1% zinc was oven-dried at 115° C. for 16 hours to remove substantially all free water therefrom. This dried pigment was then hydroclassified, coated with aluminum hydroxide according to Example 3 and labeled Pigment F. This pigment was formed into a paint in the same manner as shown in Example 3. The resulting paste was tested for its mixing and consistency characteristics as shown above with the following results:

| Pigment | Zn Content As ZnO, percent | Ball Time, seconds | Break Time, seconds | Viscosity, sec./100 rev. |
| --- | --- | --- | --- | --- |
| F | 0.10 | 120 | 140 | 180 |

Comparison of these results with the results of Example 3 demonstrates that the step of intensively drying the pigment caused a further improvement in the mixing and consistency characteristics of the pigment.

*Example 6*

300 parts of a calciner discharge corresponding to that of Example 1 and containing 1.04% Zn as ZnO was leached with 335 parts of a 10% aqueous sodium hydroxide solution for one hour at 70° C. The leached titanium dioxide was dewatered, washed with water until the pH of the filtrate was 8.0, and a sample analyzed for zinc. The titanium dioxide was then further finished to pigmentary form (pigment G) and evaluated for gloss and color, all in accordance with the procedures set forth in Example 1. A comparative evaluation was made of the pigment finished by the same procedure from which however the leaching step was omitted (pigment H). Results are as follows:

| Pigment | Zn Content As ZnO, percent | Gloss | Color |
| --- | --- | --- | --- |
| G | 0.45 | 7 | 10½ |
| H | 1.04 | 5 | 8 |

*Example 7*

300 parts of the calciner discharge employed in Example 6 was leached in a liquor composed of 250 g. of ammonium chloride, 126 g. of ammonia and 624 g. water for 1 hr. at 55° C. The leached material was filtered and washed until the pH of the filtrate was 8.0. The washed cake was then dispersed in water to a concentration of 15%–20% solids with the aid of 0.03% $SiO_2$ as sodium silicate on the weight of the $TiO_2$ present. The deflocculated slurry was then hydroclassified to eliminate non-pigmentary particles. The fines were flocinate with 1% $BaCl_2 \cdot 2H_2O$ and dewatered. After dewatering the cake was dried to a substantially anhydrous condition and then micropulverized.

The pigment so prepared (pigment I) was analyzed for zinc and evaluated for gloss and color in accordance with the method of Example 1. A comparative evaluation was made of the pigment made by the same procedure from which the leaching step was omitted (pigment J). Results are as follows:

| Pigment | Zn Content As ZnO, percent | Gloss | Color |
|---|---|---|---|
| I | 0.40 | 7½ | 10½ |
| J | 1.04 | 5 | 8 |

We claim:

1. In the finishing of a conditioned rutile titanium dioxide into pigmentary form, said titanium dioxide containing between about ½% to 5% by weight of zinc calculated as ZnO and based on the weight of the titanium dioxide, the step of selectively leaching said titanium dioxide to remove zinc therefrom for a time sufficient to remove at least 25% of said zinc and for a time insufficient to reduce the zinc content of said titanium dioxide, calculated as ZnO, to less than about 0.05% by weight.

2. A method according to claim 1 wherein the titanium dioxide is leached until its zinc content is about ¼%, calculated at ZnO.

3. A method according to claim 1 wherein the titanium dioxide is leached with a mineral acid.

4. A method according to claim 1 wherein the titanium dioxide is leached with sulfuric acid of about 10% concentration.

5. A method according to claim 4, wherein the titanium dioxide is leached at a temperature of about 70° C.

6. In the finishing of a conditioned rutile titanium dioxide containing between about ½% to 5% by weight of zinc calculated as ZnO into pigmentary form, wherein the titanium dioxide is deflocculated and hydroclassified to remove particles of non-pigmentary size therefrom, the step of selectively leaching said titanium dioxide to remove zinc therefrom until the zinc content thereof is between ⅓% and 0.05% by weight calculated as ZnO, said leaching step being performed prior to said hydroclassification step.

7. In the finishing of a conditioned rutile titanium dioxide formed by calcination of a washed titania hydrolysate comprising ½% to 5% by weight of a zinc compound calculated as ZnO and based on the $TiO_2$ equivalent of said hydrolysate, said zinc compound being a compound which is convertible to ZnO between 600° C. and 1100° C., the step of selectively leaching the conditioned rutile titanium dioxide thus produced to remove zinc therefrom, until the zinc content of said titanium dioxide is between ⅓% and 0.05% by weight calculated as ZnO.

8. In the finishing of a conditioned rutile titanium dioxide into pigmentary form, said titanium dioxide containing between about ½% to 5% by weight of zinc calculated as ZnO and based on the weight of the titanium dioxide, the steps of selectively leaching said titanium dioxide to remove zinc therefrom for a time sufficient to remove at least 25% of said zinc and for a time insufficient to reduce the zinc content of said titanium dioxide, calculated as ZnO, to less than about 0.05% by weight, and drying said titanium dioxide to remove substantially all the free water therefrom.

9. In a method of finishing a rutile titanium dioxide formed by the combustion of a gaseous mixture comprising titanium tetrachloride and zinc chloride with oxygen, the weight of said zinc chloride being from 1.2% to 12% of the weight of said titanium tetrachloride, the step of leaching said rutile titanium dioxide to remove zinc therefrom until the zinc content thereof is between about ⅓% and 0.05% by weight calculated as ZnO.

References Cited in the file of this patent

UNITED STATES PATENTS 2,559,638     Krchma et al.     July 10, 1951

OTHER REFERENCES

"Comprehensive Treatise on Inorganic and Theoretical Chemistry," Mellor, vol. 4, page 415, Longmans, Green and Co., London, England, 1923.

"Titanium" (Barksdale), Ronald Press Co., N. Y.; copyright 1949.